US012764253B2

(12) United States Patent
Park et al.

(10) Patent No.: US 12,764,253 B2
(45) Date of Patent: Oct. 13, 2026

(54) METHOD AND SYSTEM FOR PROVIDING VIDEO CONFERENCE SERVICE

(71) Applicant: SAMSUNG SDS CO., LTD., Seoul (KR)

(72) Inventors: Myoung Hee Park, Seoul (KR); Young Kwang Kim, Seoul (KR); Hye Su Lee, Seoul (KR); Ki Hwan Kwon, Seoul (KR); Jun Ho Kang, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 204 days.

(21) Appl. No.: 18/677,334

(22) Filed: May 29, 2024

(65) Prior Publication Data

US 2024/0406017 A1 Dec. 5, 2024

(30) Foreign Application Priority Data

May 31, 2023 (KR) ........................ 10-2023-0069853

(51) Int. Cl.

| | |
|---|---|
| ***H04N 7/15*** | (2006.01) |
| ***H04L 12/18*** | (2006.01) |
| ***H04L 65/403*** | (2022.01) |
| ***H04N 7/14*** | (2006.01) |

(52) U.S. Cl.

CPC ........... *H04N 7/15* (2013.01); *H04L 12/1822* (2013.01); *H04L 12/1827* (2013.01); *H04L 65/403* (2013.01); *H04N 7/142* (2013.01); *H04N 7/152* (2013.01)

(58) Field of Classification Search

None

See application file for complete search history.

(56) References Cited

U.S. PATENT DOCUMENTS

| | | | | |
|---|---|---|---|---|
| 9,019,336 | B2 | 4/2015 | Lindblom et al. | |
| 9,961,608 | B2 | 5/2018 | Jafry et al. | |
| 11,381,410 | B1 * | 7/2022 | Yemul | H04L 12/1827 |
| 11,843,644 | B2 * | 12/2023 | Kumar Agrawal | H04L 65/403 |
| 2009/0232129 | A1 | 9/2009 | Wong et al. | |
| 2017/0223064 | A1 * | 8/2017 | Le Devehat | G06F 3/04847 |
| 2017/0373870 | A1 | 12/2017 | Hrustanovic et al. | |
| 2021/0136129 | A1 | 5/2021 | Ponnusamy et al. | |

(Continued)

FOREIGN PATENT DOCUMENTS

| | | | |
|---|---|---|---|
| CN | 110446003 | A | 11/2019 |
| KR | 10-2013-0116592 | A | 10/2013 |

(Continued)

OTHER PUBLICATIONS

Extended European Search Report dated Oct. 23, 2024 in European Application No. 24178403.2.

*Primary Examiner* — Quoc D Tran

(74) *Attorney, Agent, or Firm* — Sughrue Mion, PLLC

(57) ABSTRACT

A method for providing a video conference service is provided. The method may include receiving status data of a plurality of terminals logged in with an account of a first participant; determining video priorities of the plurality of terminals based on the received status data; selecting a first terminal, among the plurality of terminals, to transmit a video of the first participant based on the video priorities; and transmitting the video of the first participant received from the first terminal to terminals of other participants.

14 Claims, 10 Drawing Sheets

(56) References Cited

U.S. PATENT DOCUMENTS

| | | | |
|---|---|---|---|
| 2023/0081041 | A1 | 3/2023 | Lee et al. |
| 2023/0283647 | A1* | 9/2023 | Chan .................... H04L 12/1831 |
| 2024/0179390 | A1* | 5/2024 | Lo ........................ G06V 40/161 |

FOREIGN PATENT DOCUMENTS

| | | | |
|---|---|---|---|
| KR | 10-2162049 | B1 | 10/2020 |
| WO | 2013/066290 | A1 | 5/2013 |

* cited by examiner

METHOD AND SYSTEM FOR PROVIDING VIDEO CONFERENCE SERVICE

CROSS-REFERENCE TO RELATED APPLICATION

This application claims priority from Korean Patent Application No. 10-2023-0069853 filed on May 31, 2023, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method and system for providing a video conference service, and more particularly, to a method for selecting different terminals for transmitting audio and video of video conference participants and a system to which the method is applied.

2. Description of the Related Art

Users participating in online video conferences may participate in the conferences through a plurality of terminals such as smartphones, desktops, laptops, and tablet PCs. At this time, in the case of a conventional conference service provision system, since each terminal that entered the conference with one participant account is managed as a different participant, only the user's video captured on the terminal where the user's audio is being input may be provided as a service.

That is, even though the participant's video may be transmitted from other terminals logged in with the conference participant's account, there is a usability issue in that the participant's video may not be provided when a camera of the terminal through which the conference participant's audio is input is turned off.

Accordingly, technology is required to overcome the technical limitation that conference participants' audio and video are provided only through one terminal and to solve the usability issue by differently selecting terminals that transmit audio and video of the conference participants.

SUMMARY

Aspects of the present disclosure provide a method and device that may determine a priority of a plurality of terminals based on terminal information of a plurality of users participating in a conference.

Aspects of the present disclosure also provide a method and device that may differently select a terminal to transmit the user's audio and video, when there are multiple terminals logged in with the same user account.

Aspects of the present disclosure also provide a method and device that may select an optimal terminal to transmit a user's video based on terminal information of a plurality of terminals logged in with the same user account.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to the present exemplary embodiment, since the audio and video of participants may be separated and the video conference service may be provided based on the audio and video of participants received from different terminals, the satisfaction and usability of service users may be improved.

According to the present exemplary embodiment, as the participant's video is transmitted through other terminals logged in with the participant's account even when the camera of the terminal where the participant's audio is input is turned off, the conference may smoothly proceed, and the quality of the conference service may be effectively improved.

It should be noted that the effects of the present disclosure are not limited to those described above, and other effects of the present disclosure will be apparent from the following description.

According to an aspect of an example embodiment of the disclosure, provided is a method for providing a video conference service performed on at least one computing device, the method including: receiving status data of a plurality of terminals logged in with an account of a first participant; determining video priorities of the plurality of terminals based on the received status data; selecting a first terminal, among the plurality of terminals, to transmit a video of the first participant based on the video priorities; and transmitting the video of the first participant received from the first terminal to terminals of other participants.

The status data may include a group ID corresponding to the account of the first participant, a terminal ID of a terminal of the first participant, and information about a camera power status of the terminal of the first participant.

A video priority may be determined based on a video weight value, the video weight value being obtained using the status data and additional data, and the additional data may include at least one of a video resolution of the terminal of the first participant, network quality information of the terminal of the first participant, a distance from the first participant, and an analyzed intention of the first participant who speaks.

The video priority may have a value that increases as the video weight value increases.

The video priority may be adjusted based on at least one of a change in a login status of the account of the first participant and a change in the camera power status of the terminal of the first participant.

The selecting of the first terminal may include: inquiring video priority data for the account of the first participant in a video priority table associated with one or more accounts of each participant; and selecting, based on a result of the inquiring, the first terminal that has a highest video priority among the plurality of terminals.

The first terminal may have a highest video priority based on a camera of the first terminal being turned on.

The method may further include: receiving status data from a second terminal, based on the second terminal, previously not logged in with the account of the first participant, being logged in with the account of the first participant; adjusting video priorities of a plurality of terminals including the second terminal, based on the status data of the second terminal; reselecting a terminal, among the plurality of terminals including the second terminal, to transmit the video of the first participant based on the adjusted video priorities; and transmitting the video of the first participant received from the reselected terminal to the terminals of the other participants.

The method may further include: adjusting the video priorities of the plurality of terminals based on the first terminal being logged out of the account of the first participant; reselecting a terminal, among the plurality of terminals, to transmit the video of the first participant based on the adjusted video priorities; and transmitting the video of the first participant received from the reselected terminal to the terminal of the other participants.

The method may further include: adjusting the video priorities of the plurality of terminals based on a camera power status of the first terminal being changed; reselecting a terminal, among the plurality of terminals, to transmit the video of the first participant based on the adjusted video priorities; and transmitting the video of the first participant received from the reselected terminal to the terminal of the other participants.

According to an aspect of an example embodiment of the disclosure, provided is a system for providing a video conference service, the system including: a terminal information management server configured to manage status data of a plurality of user terminals of participants that participate in an online video conference; and a terminal selection server configured to, with respect to a plurality of terminals logged in with an account of a first user, determine video priorities of the plurality of terminals using status data of the plurality of terminals received from the terminal information management server and select, among the plurality of terminals, a first terminal to transmit a video of the first user to terminals of other participants based on the video priorities.

The terminal selection server may be further configured to: receive audio data of the first user who speaks, through a second terminal among the plurality of terminals, and transmit the audio data of the first user through the second terminal to the terminals of the other participants.

According to an aspect of an example embodiment of the disclosure, provided is a system for providing a video conference service, the system including: at least one processor; and a memory configured to store instructions, wherein the instructions, when executed by the at least one processor, cause the at least one processor to perform: receiving status data of a plurality of terminals logged in with an account of a first participant; determining video priorities of the plurality of terminals based on the received status data; selecting a first terminal, among the plurality of terminals, to transmit a video of the first participant based on the video priorities; and transmitting the video of the first participant received from the first terminal to terminals of other participants.

The status data may include a group ID corresponding to the account of the first participant, a terminal ID of a terminal of the first participant, and information about a camera power status of the terminal of the first participant.

A video priority may be determined based on a video weight value, the video weight value being obtained using the status data and additional data, and the additional data may include at least one of a video resolution of the terminal of the first participant, network quality information of the terminal of the first participant, a distance from the first participant, and an analyzed intention of the first participant who speaks.

The video priority may be adjusted based on at least one of a change in a login status of the account of the first participant and a change in the camera power status of the terminal of the first participant.

The selecting of the first terminal may include: inquiring video priority data for the account of the first participant in a video priority table associated with one or more accounts of each participant; and selecting, based on a result of the inquiring, the first terminal that has a highest video priority among the plurality of terminals.

The instructions may further cause the at least one processor to perform: receiving status data from a second terminal, based on the second terminal, previously not logged in with the account of the first participant, being logged in with the account of the first participant; adjusting video priorities of a plurality of terminals including the second terminal, based on the status data of the second terminal; reselecting a terminal, among the plurality of terminals including the second terminal, to transmit the video of the first participant based on the adjusted video priorities; and transmitting the video of the first participant received from the reselected terminal to the terminals of the other participants.

The instructions may further cause the at least one processor to perform: adjusting the video priorities of the plurality of terminals based on the first terminal being logged out of the account of the first participant; reselecting a terminal, among the plurality of terminals, to transmit the video of the first participant based on the adjusted video priorities; and transmitting the video of the first participant received from the reselected terminal to the terminal of the other participants.

The instructions may further cause the at least one processor to perform: adjusting the video priorities of the plurality of terminals based on a camera power status of the first terminal being changed; reselecting a terminal, among the plurality of terminals, to transmit the video of the first participant based on the adjusted video priorities; and transmitting the video of the first participant received from the reselected terminal to the terminal of the other participants.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In describing the present disclosure, when it is determined that the detailed description of the related well-known configuration or function may obscure the gist of the present disclosure, the detailed description thereof will be omitted.

Unless otherwise defined, terms used in the following embodiments (including technical and scientific terms) may be used in a meaning that can be commonly understood by those of ordinary skill in the art to which the present disclosure belongs, but this may vary depending on the intention of engineers working in the related field, precedents, and the emergence of new technologies. Terminology used in this disclosure is for describing the embodiments and is not intended to limit the scope of the disclosure.

Expressions in the singular number used in the following embodiments include plural concepts unless the context clearly indicates that the singular number is specified. Also, plural expressions include singular concepts unless clearly specified as plural in context.

In addition, terms such as first, second, A, B, (a), and (b) used in the following embodiments are only used to distinguish certain components from other components, and the terms does not limit the nature, sequence, or order of the components.

Hereinafter, embodiments of the present disclosure are described with reference to the accompanying drawings.

Figure 1:
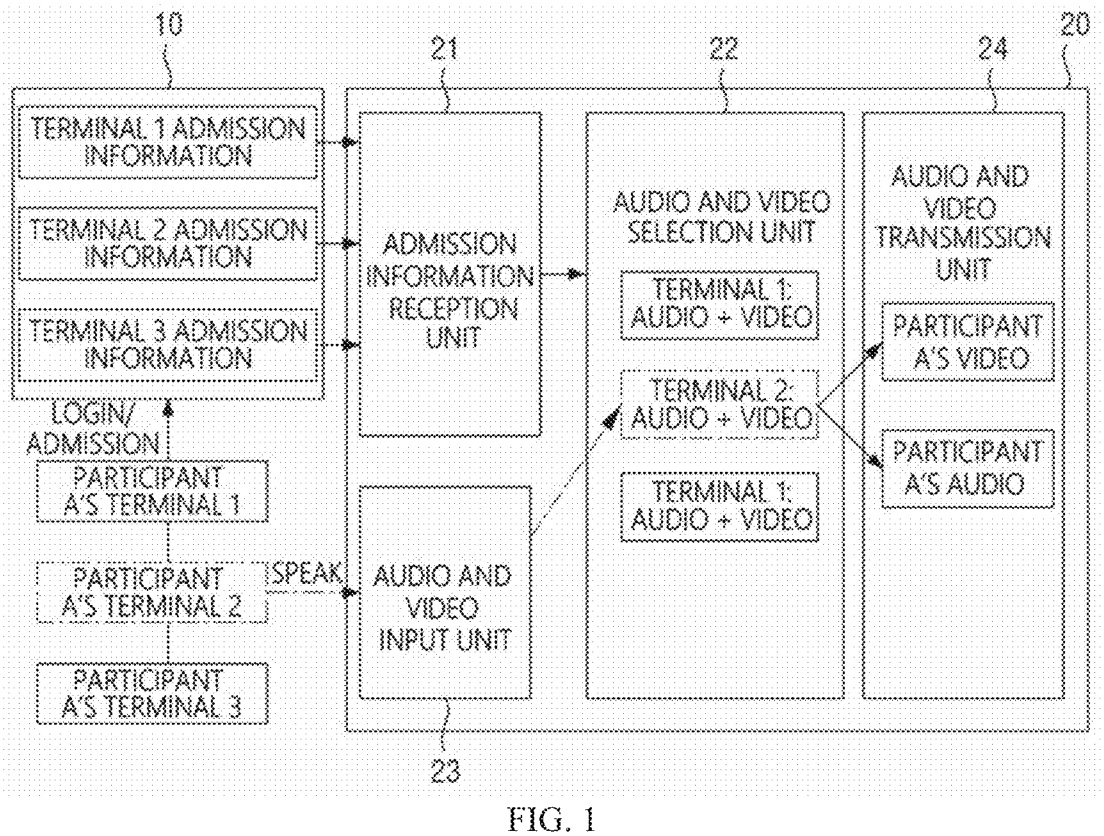
FIG. 1 is an exemplary diagram of a configuration of a conventional system for providing a video conference service.

FIG. 1 is an exemplary diagram of a configuration of a conventional system for providing a video conference service.

As illustrated in FIG. 1, a conventional system for providing a video conference service may include a conference information management server 10 and an audio and video link server 20. In this case, the audio and video link server 20 may include an admission information reception unit 21, an audio and video selection unit 22, an audio and video input unit 23, and an audio and video transmission unit 24.

First, the conference information management server 10 may be a server that generates, stores, and manages admission information of a user terminal logged in with a user account. The conference information management server 10 may generate admission information for each terminal and transmit the admission information to the admission information reception unit 21 of the audio and video link server 20. In this case, when a first user logs in with a first user's account on each of a plurality of terminals, each of the plurality of terminals may be managed as a different user's terminal rather than the same user's terminal even though each of the plurality of terminals is logged in with the same user's account. For example, when the first user logs in with the first user's account on a terminal a, a terminal b, and a terminal c, the conference information management server 10 may identify and manage the terminal a as a first user's terminal, the terminal b as a second user's terminal, and the terminal c as a third user's terminal.

That is, since the plurality of terminals participating in the conference with one account of the first user are each identified and managed as the terminals of different users, it was impossible to transmit the first user's audio and video from different terminals. For example, even if a camera of a terminal through which the audio of the first user who is speaking flows is turned off, but there is an alternative terminal that may transmit the video of the user who is speaking, the video of the first user could not be transmitted. Accordingly, there is a need for technology that may transmit the audio and video of the user who is speaking from different terminals logged in with the same user's account.

Next, the audio and video link server 20 may include an admission information reception unit 21 that receives an admission message or admission information including information such as the terminal's identification number (i.e., terminal ID), camera status (e.g., whether a camera exists, whether the camera is turned on/off), and an admission type value when logging in with the user's account on the video conference service user's terminal (i.e., when entering the video conference), an audio and video input unit 23 that receives audio and video from a plurality of user terminals, an audio and video selection unit 22 that selects a terminal to transmit audio and video among the plurality of user terminals, and an audio and video transmission unit 24 that transmits audio received from a terminal of the user who is speaking and transmits the video of the terminal of the user selected in the audio and video selection unit 22.

At this time, when the camera of the terminal to which the speaker's audio is input is turned on, the audio and video selection unit 22 may select the terminal as a video transmission terminal. In addition, when the camera of the terminal through which the speaker's audio is input is turned off, the audio and video selection unit 22 may not select the video transmission terminal because the speaker's video may not transmitted. More specifically, when it is not possible to select a terminal to transmit video, various types of basic images may be transmitted so that conference participants may recognize that there is no speaker's video to be transmitted to the conference. In this case, the basic image may refer to an image indicating that there is no video in a speaker video layout or that the camera is turned off, when the speaker's audio is input from a terminal with the camera turned off or a terminal without a camera function, and may be transmitted by the audio and video transmission unit. In addition, the basic image may be stored and managed as an image file in the audio and video link server 20, and may be used to transmit substitute video when video transmission is not possible from the speaker's terminal. That is, the audio and video selection unit 22 has a technical limitation in that the user's audio and video need to be transmitted from the same terminal as the terminal into which the user's audio is input (i.e., the terminal with the camera turned on) is selected as the video transmission terminal.

Accordingly, technology is required to overcome the technical limitation that audio and video services are provided only from the same terminal and to solve a usability issue by differently selecting terminals to transmit the audio and video of users logged in with the same account and transmitting the audio and video.

Figure 2:
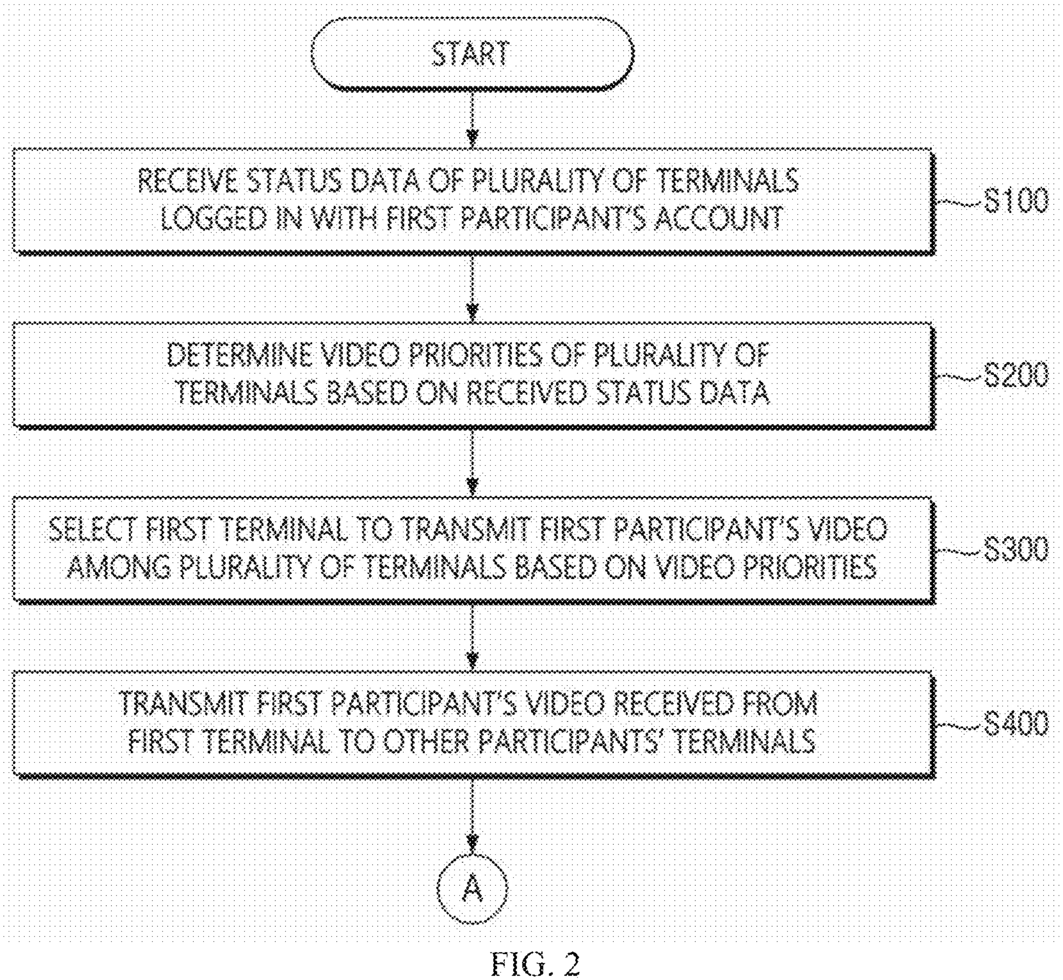
FIG. 2 is a flowchart illustrating a method for providing a video conference service according to an exemplary embodiment of the present disclosure.

FIG. 2 is a flowchart illustrating a method for providing a video conference service according to an exemplary embodiment of the present disclosure. However, this is only a preferred exemplary embodiment for achieving the object of the present disclosure, and some steps may also be added or deleted as needed. In addition, in the following descriptions, when the subject of a specific step/operation is omitted, it may be understood as being performed by the terminal selection server. A more detailed description of the configuration of the terminal selection server and the operations performed by the terminal selection server will be described later with reference to FIG. 4.

As illustrated in FIG. 2, the method for providing the video conference service according to an exemplary embodiment of the present disclosure may begin at step S100 in which the terminal selection server receives status data of a plurality of terminals logged in with a first participant account. In this case, the status data may necessarily include a group identification value (e.g., group ID) for the participant account, a terminal identification value (e.g., terminal ID) of the participant's terminal, and information about a camera power status of the participant's terminal.

In step S200, the terminal selection server 200 may determine video priorities of the plurality of terminals based on the status data received through step S100. In this case, the video priority may be determined based on a video weight value calculated using the status data and additional data. In addition, the additional data may include at least one of a video resolution of the participant's terminal, network quality information of the participant's terminal, a distance from the speaker, and a speaker's intention.

That is, the video priorities of the plurality of terminals may be determined based on video weight values calculated based on various indicators, and the higher the video weight value, the higher the video priority may be calculated. For example, the video priority of a terminal with the camera turned off may be determined to be low, and among a plurality of participants' terminals with cameras turned on, the higher the video resolution of the terminal, the better the network quality of the terminal, or the closer the distance from the speaker, the higher the video weight value and video priority may be calculated. In addition, the terminal selection server may analyze the participant's gestures, facial expressions, etc. included in the participant's video received from the plurality of participants' terminals with cameras turned on, calculate the video weight value based on the speaker's intention (e.g., information about which terminal's video is desired to be transmitted) according to the result of the analysis, and determine the video priority using the calculated video weight value. At this time, there may be a case in which the video weight value is 0. A terminal with the video weight value of 0 may refer to a terminal without a camera function, and the video priority may be calculated to be the lowest.

Meanwhile, a specific method for determining the video priorities of the plurality of terminals based on the video weight value and selecting a terminal to transmit the participant's video based on the determined video priorities will be described later with reference to FIG. 5.

In step S300, the terminal selection server 200 may select a first terminal to transmit first participant's video among the plurality of terminals based on the video priority determined in step S200. In this case, the first terminal may be one of a plurality of terminals logged in with a first participant's account. That is, among the plurality of terminals logged in with the first participant's account, a terminal with the highest video priority may be selected as the terminal to transmit the first participant's video. For example, if there is only one terminal with the camera turned on among the plurality of terminals logged in with the first participant's account, the terminal with the camera turned on may be selected as the terminal to transmit the first participant's video because the terminal with the camera turned on has the highest video priority. A detailed description of step S300 will be described later with reference to FIG. 3.

In step S400, the terminal selection server 200 may transmit the first participant's video received from the first terminal selected through step S300 to other participants' terminals. In this case, the first terminal of the first participant that transmitted the first participant's video may be different from the terminal of the first participant that transmitted the first participant's audio. For example, when the camera of the first participant's terminal that transmitted the first participant's audio is turned off, the first participant's video may be transmitted through the first terminal with the camera turned on, among other terminals logged in with the first participant's account. Accordingly, as the participant's audio and video are provided to other participants through different terminals, usability for video conference service users may be improved.

Figure 3:
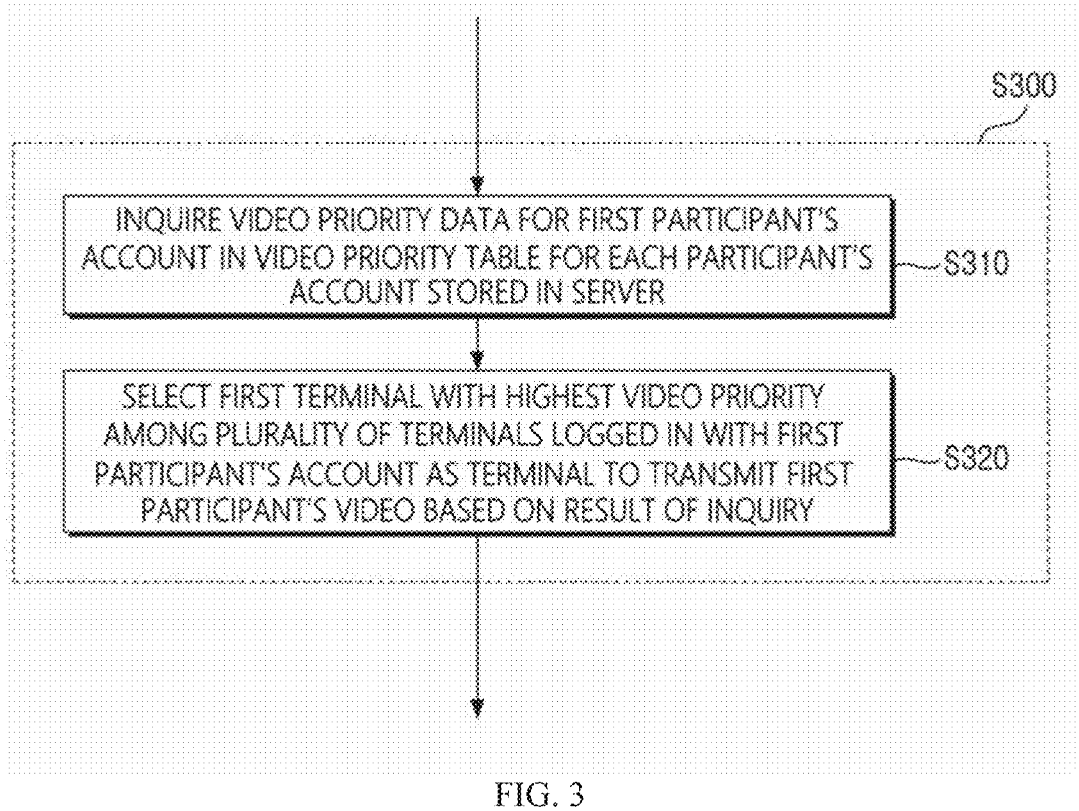
FIG. 3 is an exemplary diagram for describing some operations illustrated in FIG. 2.

FIG. 3 is an exemplary diagram for describing some operations illustrated in FIG. 2. However, this is only a preferred exemplary embodiment for achieving the object of the present disclosure, and some steps may also be added or deleted as needed.

As illustrated in FIG. 3, step S300 in which the terminal selection server 200 selects the first terminal to transmit the first participant's video among the plurality of terminals based on the video priority determined in step S200 may include step S310 of inquiring video priority data for the first participant's account in a video priority table for each participant's account stored in the terminal selection server and step S320 of selecting the first terminal with the highest video priority among the plurality of terminals logged in with the first participant's account as the terminal to transmit the first participant's video based on the result of the inquiry.

In this case, the video priority table for each participant's account may be data that groups terminals of a plurality of participants who participated in the video conference by each account of the plurality of participants and organizes the video priorities of the plurality of terminals for each participant's account in the form of a table.

Hereinafter, the configurations of a system for providing a video conference service that performs the operations described with reference to FIGS. 2 and 3 will be described with reference to FIG. 4.

Figure 4:
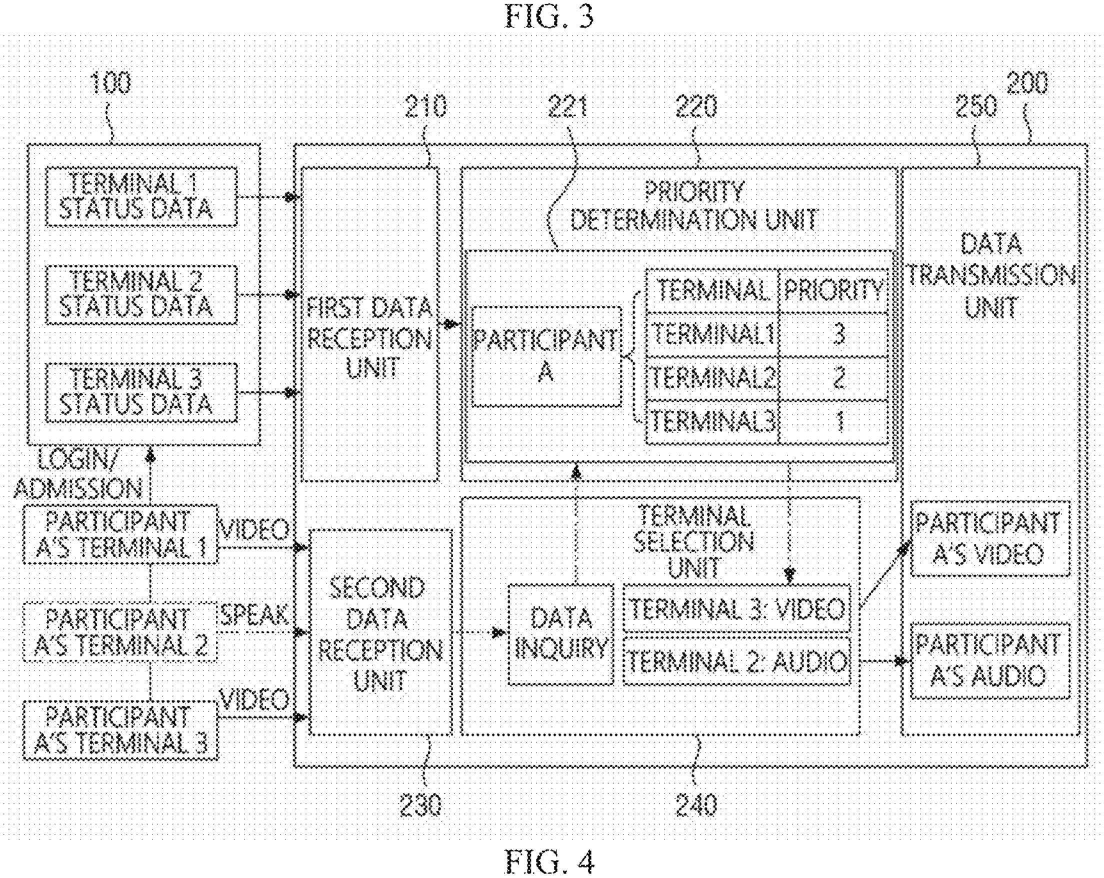
FIG. 4 is an exemplary diagram of a configuration of a system for providing a video conference service according to an exemplary embodiment of the present disclosure.

FIG. 4 is an exemplary diagram of a configuration of a system for providing a video conference service according to an exemplary embodiment of the present disclosure. More specifically, the system for providing the video conference service illustrated in FIG. 4 may have some added or modified configurations compared to the configurations of the conventional system for providing the video conference service illustrated in FIG. 1, in order to overcome the technical limitation of providing the audio and video service only on the same terminal.

As illustrated in FIG. 4, a system for providing a video conference service according to an exemplary embodiment of the present disclosure may include a terminal information management server 100 and a terminal selection server 200.

In this case, the terminal selection server 200 may include a first data reception unit 210, a priority determination unit 220, a second data reception unit 230, a terminal selection unit 240, and a data transmission unit 250.

First, the terminal information management server 100 may refer to a computing device/system that transmits status data of a video conference participant's terminal (not illustrated) to the terminal selection server 200. In addition, the terminal information management server 100 may perform various operations/functions for collecting and managing reference data for determining video priorities of a plurality of video conference participants' terminals, and improving an accuracy of video transmission terminal selection.

More specifically, the terminal information management server 100 may be a server that generates, stores, and manages login information of a participant's terminal when a participant logs in with a participant's account on the video conference participant's terminal. The terminal information management server 100 may generate login information for each participant's terminal and transmit the login information to the first data reception unit 210 of the terminal selection server 200. In this case, the login information of the participant's terminal may include an identification value (i.e., group ID) corresponding to the logged-in participant's account.

More specifically, the login information of the terminal may include a unique ID of each terminal, a status of the terminal, and participant's account information. The point in time when the group ID is generated or assigned is the point in time when the user logs in on the terminal, and when a terminal logs in, the terminal information management server 100 may assign the same group ID to the terminal if the terminal is the same as account information of an existing participant, and may assign a new group ID to a terminal if the terminal is not the same as the account information of the existing participant. In addition, the terminal information management server 100 may perform the role of generating and managing data to be transmitted to the terminal selection server 200 through managing the login information of the terminal and generating and assigning the group ID. In this case, the group ID may also be the participant's account, and may also be expressed as a representative ID that groups terminals generated in a different form from the participant's account.

Next, the terminal selection server 200 may include a first data reception unit 210 that receives status data of the terminal including information such as an identification value (i.e., group ID) corresponding to the participant's account, the participant's terminal identification number (i.e., terminal ID), a camera status (e.g., whether a camera exists, whether the camera is turned on/off), an admission type value, etc. when logging in with a participant's account on the video conference participant's terminal (i.e., entering the video conference), a priority determination unit 220 that determines video priorities of a plurality of terminals using the status data received from participant's terminal, a second data reception unit 230 that receives audio and video from the terminals of video conference participants, a terminal selection unit 240 that selects a terminal to transmit the audio and video, and a data transmission unit 250 that transmits the terminal's video selected in the audio and video selection unit 22.

In this case, the priority determination unit 220 may group the status data of the plurality of participants' terminals transmitted from the first data reception unit 210 based on the group ID corresponding to the participant's account. In addition, the priority determination unit 220 may determine a video priority for each group of the participants' terminals based on the video weight value calculated using the status data and additional data of the participants' terminals. In this case, the priority determination unit 220 may generate a video priority table 221 for each participant's account, and the video priority table 221 for each participant's account may refer to a table in which the video priority between the plurality of terminals logged in with one participant's account is organized for each participant's account as illustrated in FIG. 4.

In addition, the terminal selection unit 240 may check a power status of a camera of a terminal to which the speaker's audio is input. At this time, when the camera of the terminal to which the speaker's audio is input is turned on, the terminal selection unit 240 may select the terminal as a video transmission terminal. In addition, when the camera of the terminal is turned off, the terminal selection unit 240 may inquire the data of the priority determination unit 220 using the group ID of the terminal, and select a terminal with the highest video priority among a plurality of terminals with the same group ID as the video transmission terminal. That is, among the plurality of terminals logged in with the same participant's account, a terminal with the highest video priority may be selected as the video transmission terminal.

Accordingly, as the participant's video is transmitted through other terminals logged in with the participant's account even when a camera of a terminal to which participant's audio is input is turned off, the overall quality of conference service may be effectively improved. In addition, the satisfaction and usability of the users participating in the video conference may be improved.

Meanwhile, the terminal information management server 100 and the terminal selection server 200 may be implemented with at least one computing device. For example, all functions of the terminal information management server 100 and the terminal selection server 200 may be implemented in one computing device, and a first function of the terminal information management server 100 and the terminal selection server 200 may be implemented in a first computing device, and a second function thereof may be implemented in a second computing device. Alternatively, specific functions of the terminal information management server 100 and the terminal selection server 200 may be implemented in a plurality of computing devices.

The computing device may include any device having a computing function, and an example of such a device will be described with reference to FIG. 11. Since the computing device is an aggregate in which various components (e.g., memory, processor, etc.) interact, the computing device may be referred to as a "computing system" in some cases. In addition, the computing system may also refer to an aggregate in which a plurality of computing devices interact.

Furthermore, the computing device may be a server (including VM, Cloud, etc.), a desktop, a laptop, etc., but is not limited thereto and may include all types of devices equipped with a computing function. An example of the computing device will be described with reference to FIG. 11.

A user terminal (i.e., participant's terminal) may refer to a computing device used by a user (i.e., conference participant, speaker) to transmit audio data and video data of the conference participant to the terminal selection server 200 and receive audio data and video data of other conference participants. In this case, the user terminal (i.e., participant's terminal) may be implemented as various types of computing devices such as smartphones, desktops, laptops, etc., and may be implemented as any device. An example of such a computing device will be described with reference to FIG. 11.

Referring again to FIG. 4, the second data reception unit 230 may receive audio data and video data from the participants' terminals, and may transmit the received data to the terminal selection unit 240. In addition, the data transmission unit 250 may transmit the participant's video received through the terminal selected by the terminal selection unit 240, and may transmit the received participant's audio through the terminal of the participant who is speaking. That is, the data transmission unit 250 may transmit the participant's video received from the selected terminal to other participants' terminals based on the video priority together with the audio of the participant who is speaking.

In summary, as illustrated in FIG. 4, a participant A participating in the video conference may log in with a participant's account on a plurality of terminals (i.e., terminal 1, terminal 2, and terminal 3), and status data of the plurality of logged-in terminals may be transmitted to the terminal information management server 100. In this case, the terminal information management server 100 may also receive not only the status data of the plurality of terminals that may be received at the point in time when the participant A logs in with his or her account, but also additional data (e.g., a distance from the speaker, a speaker's intention, a real-time network quality, a real-time video resolution of terminal, etc.) that may be acquired during a video conference process after the point in time of logging in. The status data and the additional data of the plurality of terminals may be transmitted to the priority determination unit 220 through the first data reception unit 210.

The priority determination unit 220 may determine the video priority of the plurality of terminals (i.e., terminal 1, terminal 2, and terminal 3) logged in with the participant's account based on the video weight value calculated using the status data and the additional data received from the terminal information management server 100. In this case, the plurality of terminals may be grouped based on the group ID corresponding to the participant's account, and the video priority may be determined for each group. For example, the video priority of the terminal 1 logged in with the participant A's account may be determined as a third priority, the video priority of the terminal 2 logged in with the participant A's account may be determined as a second priority, and the video priority of the terminal 3 logged in with the participant A's account may be determined as a first priority. In addition, although not illustrated, a video priority of a terminal 4 logged in with a participant B's account may be determined as a first priority, a video priority of a terminal 5 logged in with the participant B's account may be determined as a second priority, and a video priority of a terminal 6 logged in with the participant B's account may be determined as a third priority.

When the participant A is speaking through the terminal 2 in the video conference, the second data reception unit 230 may receive participant A's audio data from the terminal 2. In this case, the second data reception unit 230 may receive the participant A's video data from a terminal with a camera turned on among the terminal 1 to the terminal 3. Furthermore, the second data reception unit 230 may transmit the audio data and the video data received from the plurality of terminals to the terminal selection unit 240.

The terminal selection unit 240 may first check a camera power status of the terminal 2 where the participant A is speaking, and only when the camera of terminal 2 is turned off, the priority determination unit 220 may inquire the video priority table for each participant's account based on the group ID for the participant A's account. As a result of the inquiry, the terminal selection unit 240 may select the terminal 3 with the highest video priority among the terminals 1 to 3 grouped based on the group ID of the participant A as the terminal to transmit the participant A's video. In addition, the terminal selection unit 240 may select the terminal 2 where the participant A is speaking as the terminal to transmit the participant A's audio.

Thereafter, the data transmission unit 250 may transmit the participant A's audio received from the terminal 2 and the participant A's video received from the terminal 3 to other participants' terminals.

Accordingly, as the participant's audio and video are transmitted together to other participants' terminals, regardless of the power status of the camera of the terminal to which the audio of the participant who is speaking is input, the video conferences may be efficiently conducted. In addition, the satisfaction and usability of the users using the video conference service may be efficiently improved.

Hereinafter, a specific method by which the priority determination unit 220 determines the video priority of the plurality of participants' terminals will be described in detail with reference to FIG. 5.

Figure 5:
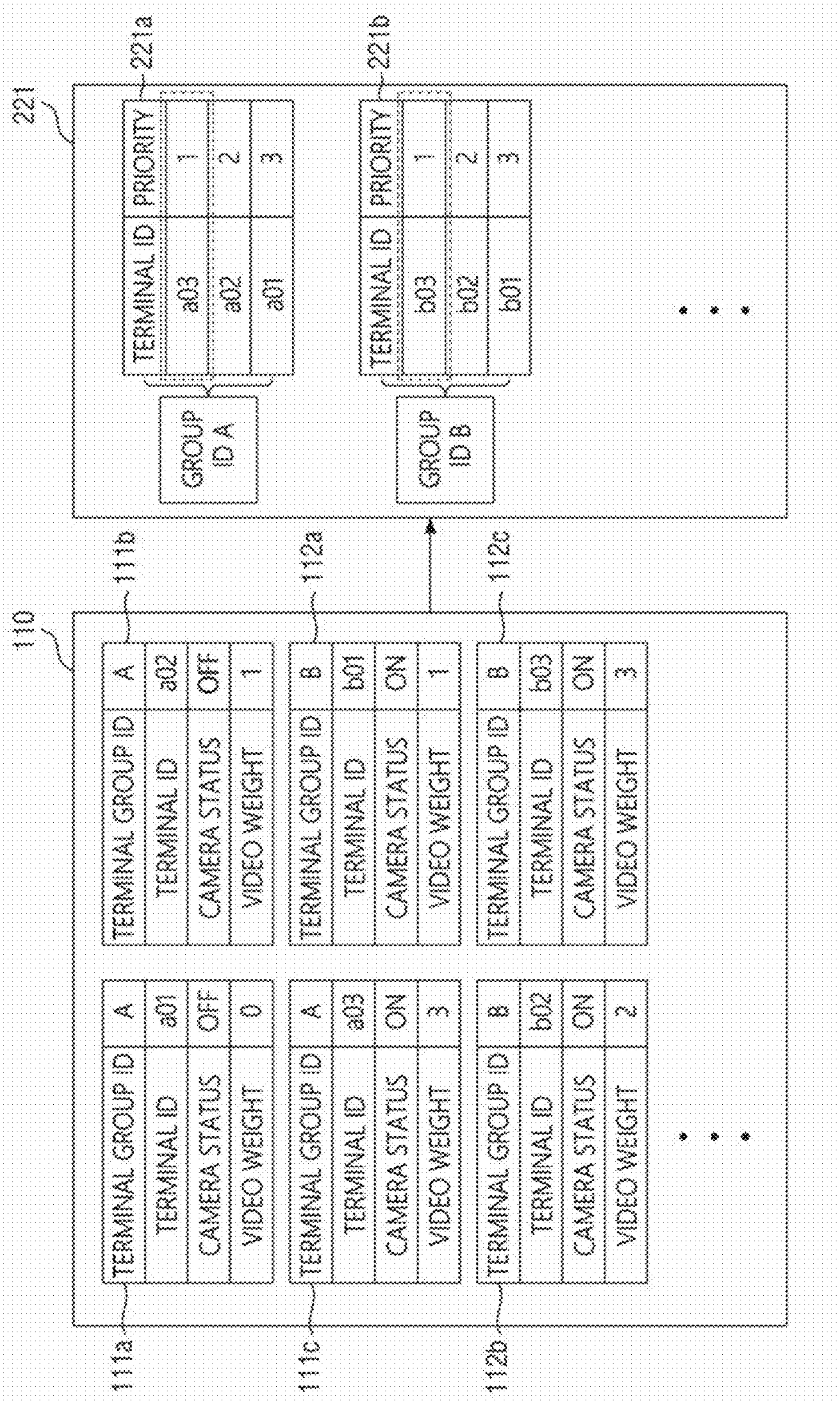
FIG. 5 is an exemplary diagram for describing a process of determining video priority described with reference to FIG. 2.

FIG. 5 is an exemplary diagram for describing a process of determining video priority described with reference to FIG. 2.

Referring to FIG. 5, based on the data received from the terminal information management server 100, the terminal selection server 200 may generate terminal data 111*a*, 111*b*, 111*c*, 112*a*, 112*b*, and 112*c* including the status data (i.e., terminal group ID, terminal ID, camera status) of each terminal of conference participants and a video weight value calculated using the status data and the additional data. In this case, the group ID of the terminal may be issued by the terminal information management server 100 based on the user's account logged in to the terminal, and the terminal ID may be a value for identifying each participant's terminal. In other words, when being logged in from a plurality of terminals with one participant's account, the same group ID may be assigned to all of the plurality of terminals, and each terminal may be assigned a different terminal ID.

For example, as illustrated in FIG. 5, it may be assumed that there are a plurality of terminals (e.g., terminal 1, terminal 2, and terminal 3) logged in with the participant A's account and a plurality of terminals (e.g., terminal 4, terminal 5, and terminal 6) logged in with the participant B's account. In addition, it may be assumed that the cameras of the terminal 1 and the terminal 2 are turned off, and the cameras of the terminals 3 to 6 are turned on.

In addition, the terminals 1 to 3 logged in with the participant A's account may be assigned the same group ID (e.g., A), and the terminals 4 to 6 logged in with the participant B's account may be assigned the same group ID (e.g., B). In addition, the terminals 1 to 6 may be assigned different terminal IDs (e.g., a01, a02, a03, b01, b02, and b03).

In addition, as illustrated in a terminal data set 110, based on the status data and the additional data of each participant's terminal, the video weight value of the terminal 1 may be calculated as 0, the video weight value of the terminal 2 may be calculated as 1, the video weight value of the terminal 3 may be calculated as 3, the video weight value of the terminal 4 may be calculated as 1, the video weight value of the terminal 5 may be calculated as 2, and the video weight value of the terminal 6 may be calculated as 3.

In this case, the video weight value may be determined by utilizing information such as whether a camera of the terminal exists, a camera power status, a video resolution of the terminal, network quality information of the terminal, a distance from the speaker, a speaker's intention, etc., at the point in time when the participant logs in with his or her account on the terminal.

Basically, the video priority of terminals with cameras turned on may be determined to be high. When the cameras of the plurality of participants' terminals are turned on, the larger the video weight value, the higher the video priority may be determined, and even when the cameras of the plurality of participants' terminals are turned off, the larger the video weight value, the higher the video priority may be determined. In addition, the video weight value may be determined by the result of analysis of input data through an AI model and the user's input data. However, the method of calculating the video weight value and determining the video priority of the plurality of terminals using the calculated video weight value is not limited to the examples above and may include various methods.

Meanwhile, referring to the terminal data 111*a* of the terminal 1 included in the terminal data set 110, it may be confirmed that the video weight value of the terminal 1 is 0. The case in which the video weight value of the terminal is 0 is a case in which the participant's video may not be transmitted, and may refer to a case in which there is no camera on the participant's terminal.

Referring again to FIG. 5, the priority determination unit 220 may generate a video priority table 221 for each group by grouping the plurality of terminal data included in the terminal data set 110 based on the group ID of the terminal. That is, a video priority table 221*a* of the terminals 1 to 3 grouped based on the group ID (i.e., A) of the terminal corresponding to the participant A's account may be generated, and a video priority table 221*b* of the terminals 4 to 6 grouped based on the group ID (i.e., B) of the terminal corresponding to the participant B's account may be generated.

More specifically, in the video priority of the plurality of terminals with the group ID of A, the terminal 3, where the camera power status is ON and the video weight value is 3, may be determined as a first priority, the terminal 2, where the camera power status is OFF and the video weight value is 1, may be determined as a second priority, and the terminal 1, where the camera power status is OFF and the video weight value is 0, may be determined as a third priority. In addition, in the video priority of the plurality of terminals with the group ID of B, the terminal 6, where the camera power status is ON and the video weight value is 3, may be determined as a first priority, the terminal 5, where the camera power status is ON and the video weight value is 2, may be determined as a second priority, and the terminal 4, where the camera power status is ON and the video weight value is 1, may be determined as a third priority.

Accordingly, if the participant A is speaking in the video conference through the terminal 1 or the terminal 2, the participant A's video received through the terminal 3 with the camera turned on may be transmitted even though the camera of the terminal to which the participant A's audio is input is turned off. As a result, the video conference may be efficiently conducted.

In addition, if the participant A is speaking in the video conference through any one of the terminals 4 to 6 with the camera turned on, optimal video of the participant A may be transmitted through the terminal selected based on the video priority. As a result, the quality of video conferencing service may be improved. Furthermore, the satisfaction and usability of the users using the video conference service may be efficiently improved.

Meanwhile, during the video conference process, if the camera status of one or more of the plurality of participants' terminals changes or the login status of one or more participant's accounts changes, the predetermined video priority may be adjusted. Hereinafter, a method for adjusting the predetermined video priority will be described with reference to FIGS. 6 to 9. First, a process of adjusting the video priority as the camera power status of the participant's terminal changes will be described with reference to FIGS. 6 and 7.

Figure 6:
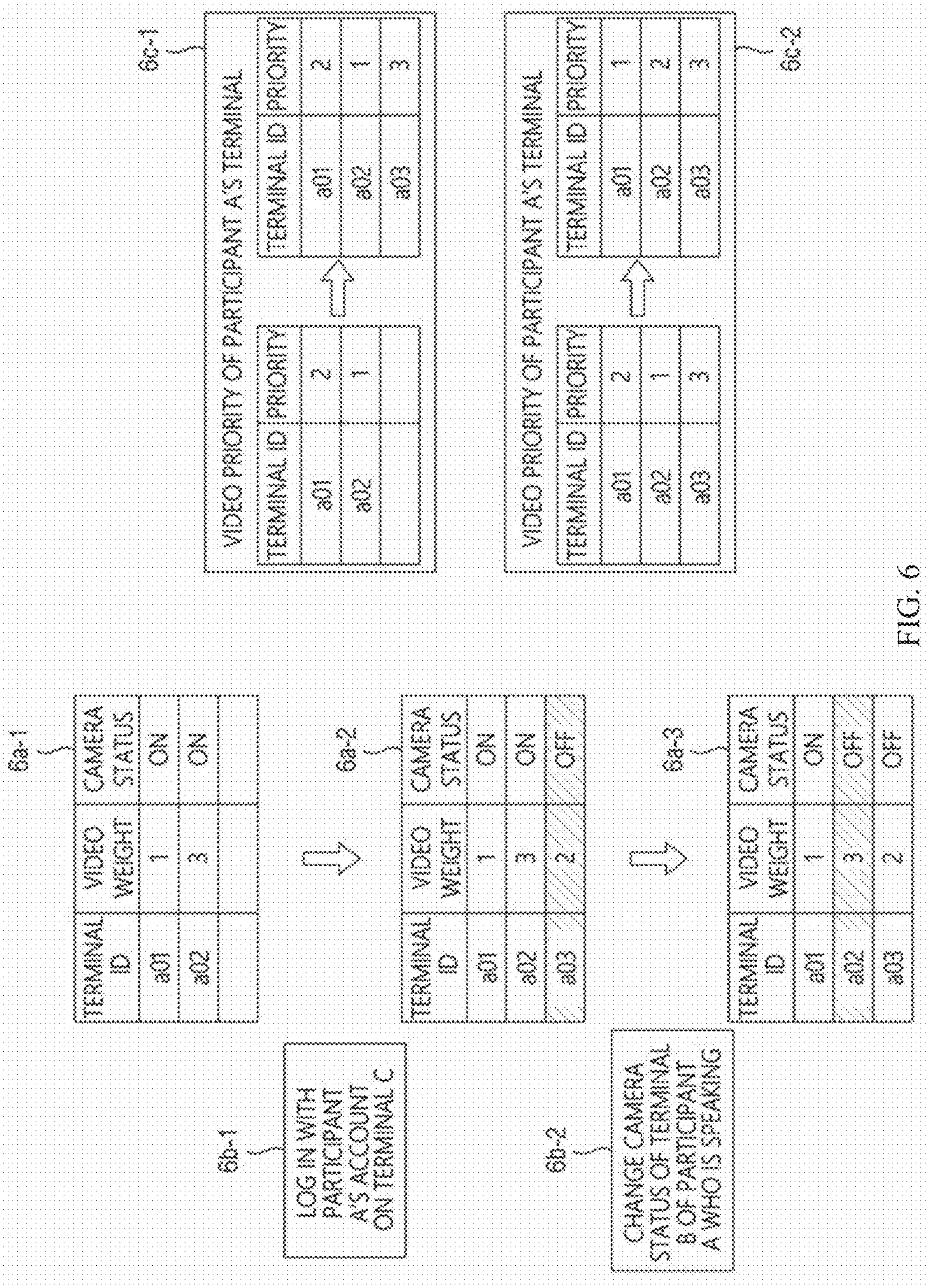
FIG. 6 is an exemplary diagram for describing a method for providing a video conference service according to a change in a camera status of a terminal, according to an exemplary embodiment of the present disclosure.

FIG. 6 is an exemplary diagram for describing a method for providing a video conference service according to a change in a camera status of a terminal, according to an exemplary embodiment of the present disclosure.

First, referring to a video priority table 6*a*-1 of the terminals logged in with the participant A's account illustrated in FIG. 6, the video weight value of a terminal 1 with a terminal ID value of a01 may be 1 and the camera status thereof may be ON, and the video weight value of a terminal 2 with a terminal ID value of a02 may be 3 and the camera status thereof may be ON. In this case, when the participant A logs in with the participant A's account on a new terminal C (6*b*-1), a03 may be assigned as the terminal ID value of the terminal C, a video weight value for the terminal C may be determined based on status data and additional data of the terminal C, and a video priority table 6*a*-2 to which the data for the terminal C is added may be generated. In addition, since the video weight value of the terminal 3 illustrated in the video priority table 6*a*-2 is 2, which is higher than the video weight value (1) of the terminal 1, but a camera power status thereof is OFF, the video priority of the terminal 3 may be determined as a third priority (see portion 6*c*-1).

Next, when the camera power status of the terminal B, where participant A's audio is being input, changes from ON to OFF (6*b*-2), a video priority table 6*a*-3 with changed data for the terminal B may be generated. In addition, since the video weight value of the terminal 2 illustrated in the video priority table 6*a*-3 is 3, but the camera power status thereof is OFF, the video priority of the terminal 1 with the camera turned on may be determined as a first priority, the video priority of the terminal 2 having a high video weight value among terminals with the camera turned off may be determined as a second priority, and the video priority of the terminal 3 may be determined as a third priority (see portion 6*c*-2).

However, in FIG. 6, the description is made assuming that the video weight value does not change even if the camera power status is changed to OFF, but the present disclosure is not limited to such an example. That is, in some exemplary embodiments, the video weight value may also be changed depending on the change in the camera power status.

In addition, in FIG. 6, the description is made assuming only the case in which the camera power status is changed from ON to OFF, but the present disclosure is not limited to such an example. That is, the camera power status of the participant's terminal may be changed from OFF to ON, and the video priority may be determined so that the terminal with the highest video weight value while the camera power status is ON has a high priority.

Figure 7:
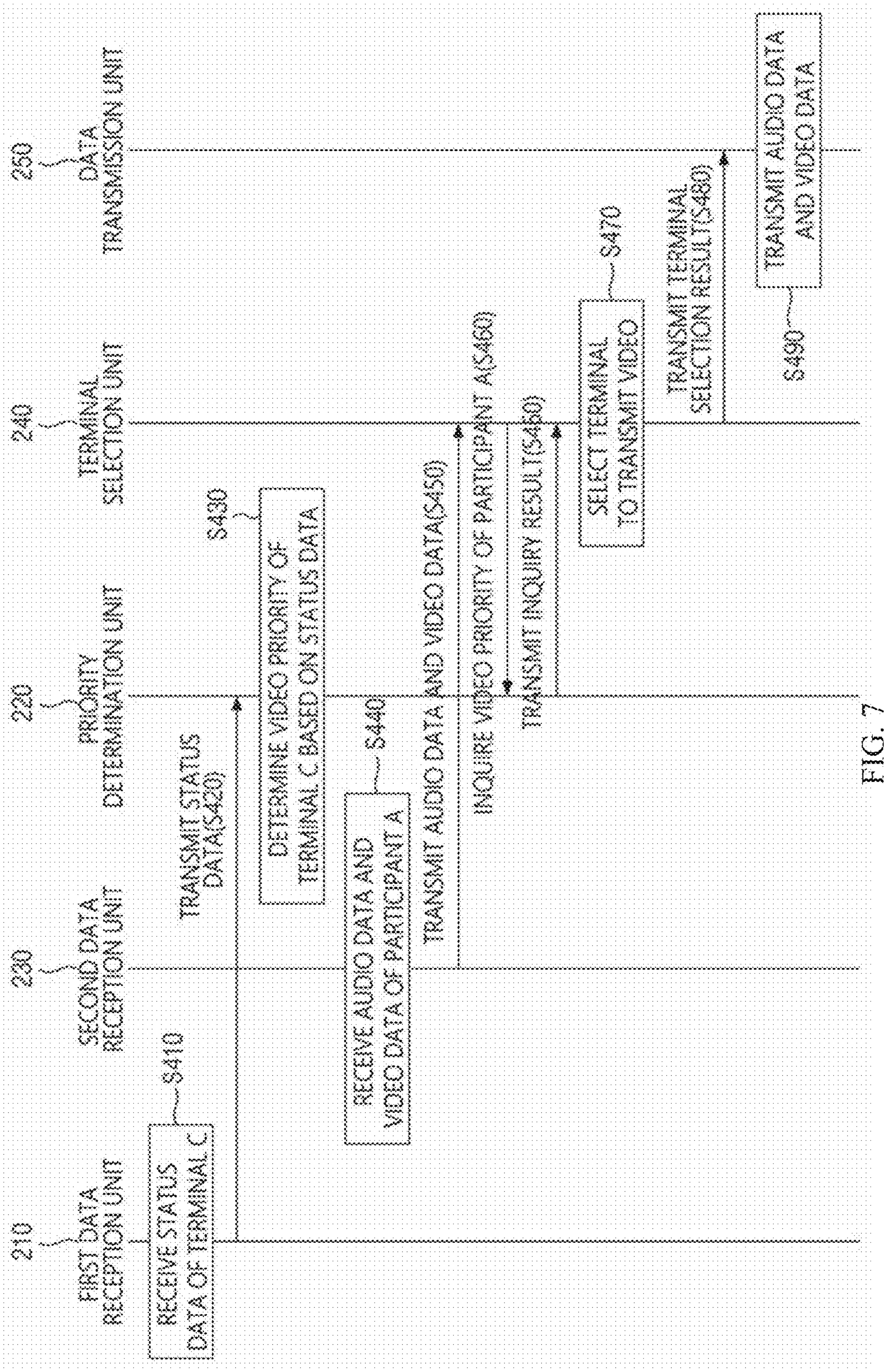
FIG. 7 is a signal flow diagram of the method for providing the video conference service described with reference to FIG. 6.

FIG. 7 is a signal flow diagram of the method for providing the video conference service described with reference to FIG. 6. However, this is only a preferred exemplary embodiment for achieving the object of the present disclosure, and some steps may also be added or deleted as needed. In addition, referring to FIG. 7, the content described with reference to FIGS. 2 to 6 may be more clearly understood.

As illustrated in FIG. 7, in step S410, when a terminal C, which is not logged in with the participant A's account, is logged in with the participant A's account, the first data reception unit 210 may receive status data of the terminal C from the terminal C, and in step S420, the first data reception unit 210 may transmit the status data of the terminal C to the priority determination unit 220. The priority determination unit 220 may determine a video priority of the terminal C based on status data of the plurality of terminals, and may generate or adjust a video priority table that reflects the determined video priority. More specifically, if the terminal C is the first terminal logged in with the participant A's account, the priority determination unit 220 may generate a new video priority table for the participant A's account, and if the terminal C is not the first terminal logged in with the participant A's account, the priority determination unit 220 may adjust the video priority for the participant A's account, which is previously determined, based on the status data of the terminal C.

In step S440, the second data reception unit 230 may receive audio data and video data from terminals logged in with the account of the participant A who is speaking at the conference, and in step S450, the second data reception unit 230 may transmit the received audio data and video data to the terminal selection unit 240. The terminal selection unit 240 may request the priority determination unit 220 to inquire about the video priorities of the terminals logged in with the participant A's account, and in step S460, the priority determination unit 220 may transmit an inquiry result for the video priority to the terminal selection unit 240 in response to the request. In this case, the transmitted inquiry result may be overall information about the video priorities of the terminals logged in with the participant A's account, and may be some information about a terminal with the highest video priority among the terminals logged in with the participant A's account.

Thereafter, the terminal selection unit 240 may select a terminal to transmit participant A's video based on the information received from the priority determination unit 220 in step S470, and may transmit a terminal selection result to the data transmission unit 250 in step S480. Finally, the data transmission unit 250 may transmit audio data and video data of the participant A. In this case, the audio data and video data of the participant A may be data received from the same terminal or different terminals.

Accordingly, the usability and convenience of the video conference service users may be improved by automatically adjusting the video priority according to the change in the camera power status of the participant's terminal. In addition, since the participant's video received from the optimal terminal selected based on the adjusted video priority may be transmitted, the video conference may be more effectively conducted, and the quality of the video conference service may be improved.

Hereinafter, a process in which video priority is adjusted according to a change in a login status of a participant's account on the participant's terminal according to an exemplary embodiment of the present disclosure will be described with reference to FIGS. 8 and 9.

Figure 8:
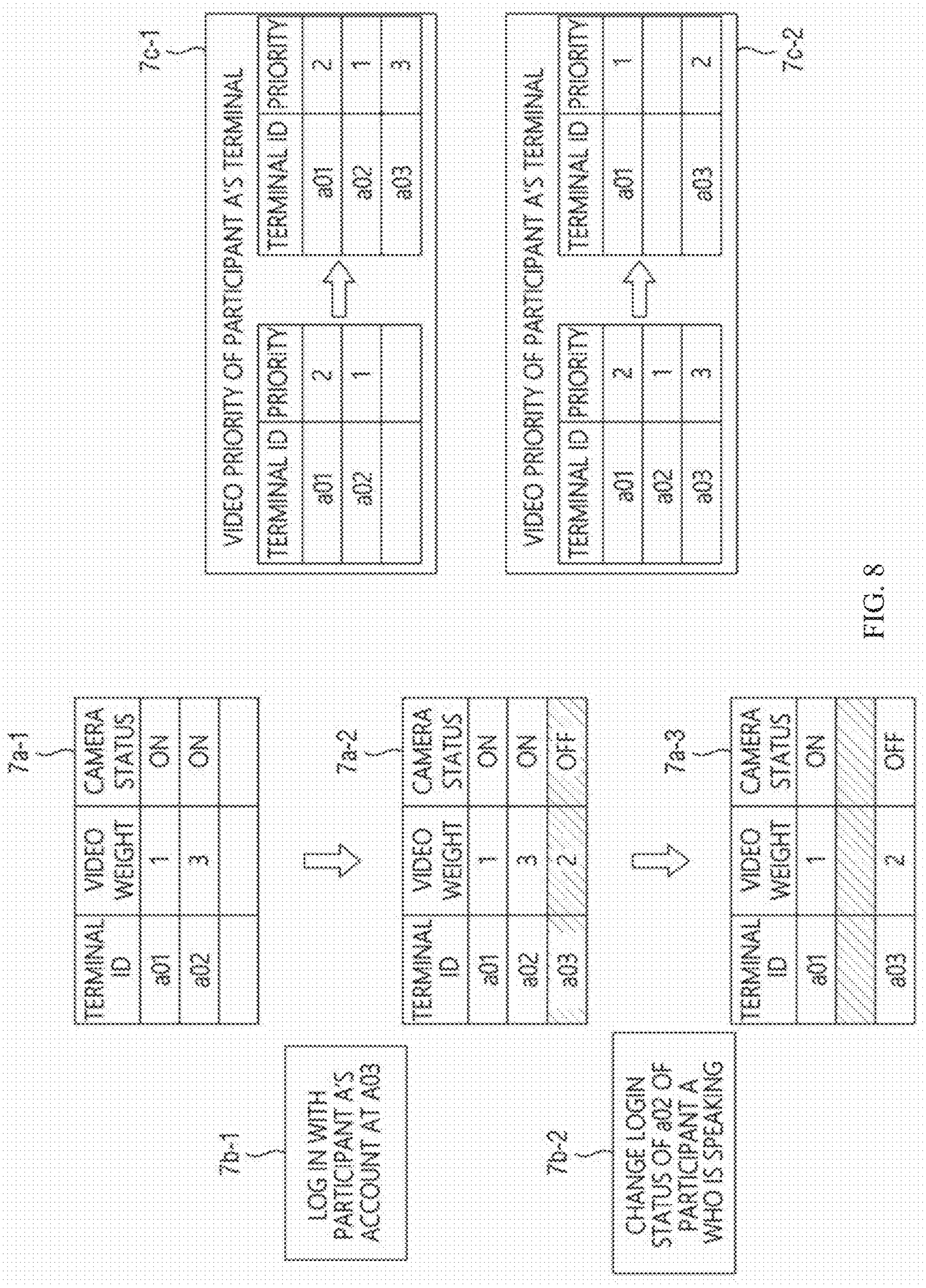
FIG. 8 is an exemplary diagram for describing a method for providing a video conference service according to a change in a login status of a participant's account, according to an exemplary embodiment of the present disclosure.

FIG. 8 is an exemplary diagram for describing a method for providing a video conference service according to a change in a login status of a participant's account, according to an exemplary embodiment of the present disclosure.

First, referring to a video priority table 7*a*-1 of the terminals logged in with the participant A's account illustrated in FIG. 8, the video weight value of a terminal 1 with a terminal ID value of a01 may be 1 and the camera status thereof may be ON, and the video weight value of a terminal 2 with a terminal ID value of a02 may be 3 and the camera status thereof may be ON. In this case, when the participant A logs in with the participant A's account on a new terminal C (6*b*-1), a03 may be assigned as the terminal ID value of the terminal C, a video weight value for the terminal C may be determined based on status data and additional data of the terminal C, and a video priority table 7*a*-2 to which the data for the terminal C is added may be generated. In addition, since the video weight value of the terminal 3 illustrated in the video priority table 6*a*-2 is 2, which is higher than the video weight value (1) of the terminal 1, but a camera power status thereof is OFF, the video priority of the terminal 3 may be determined as a third priority (see portion 7*c*-1).

Next, when the participant A logs out of the terminal B where the participant A's audio is being input (7*b*-2), a video priority table 7*a*-3 with changed data for the terminal B may be generated. That is, referring to the video priority table 7*a*-3, data for the terminal B where the participant A's account is logged out may be deleted. Accordingly, as the data of the terminal B, which had the first video priority, was deleted, the video priority of the terminal 1 may be adjusted from the second priority to the first priority, and the video priority of the terminal 3 may be adjusted from the third priority to the second priority (see portion 7*c*-2).

Figure 9:
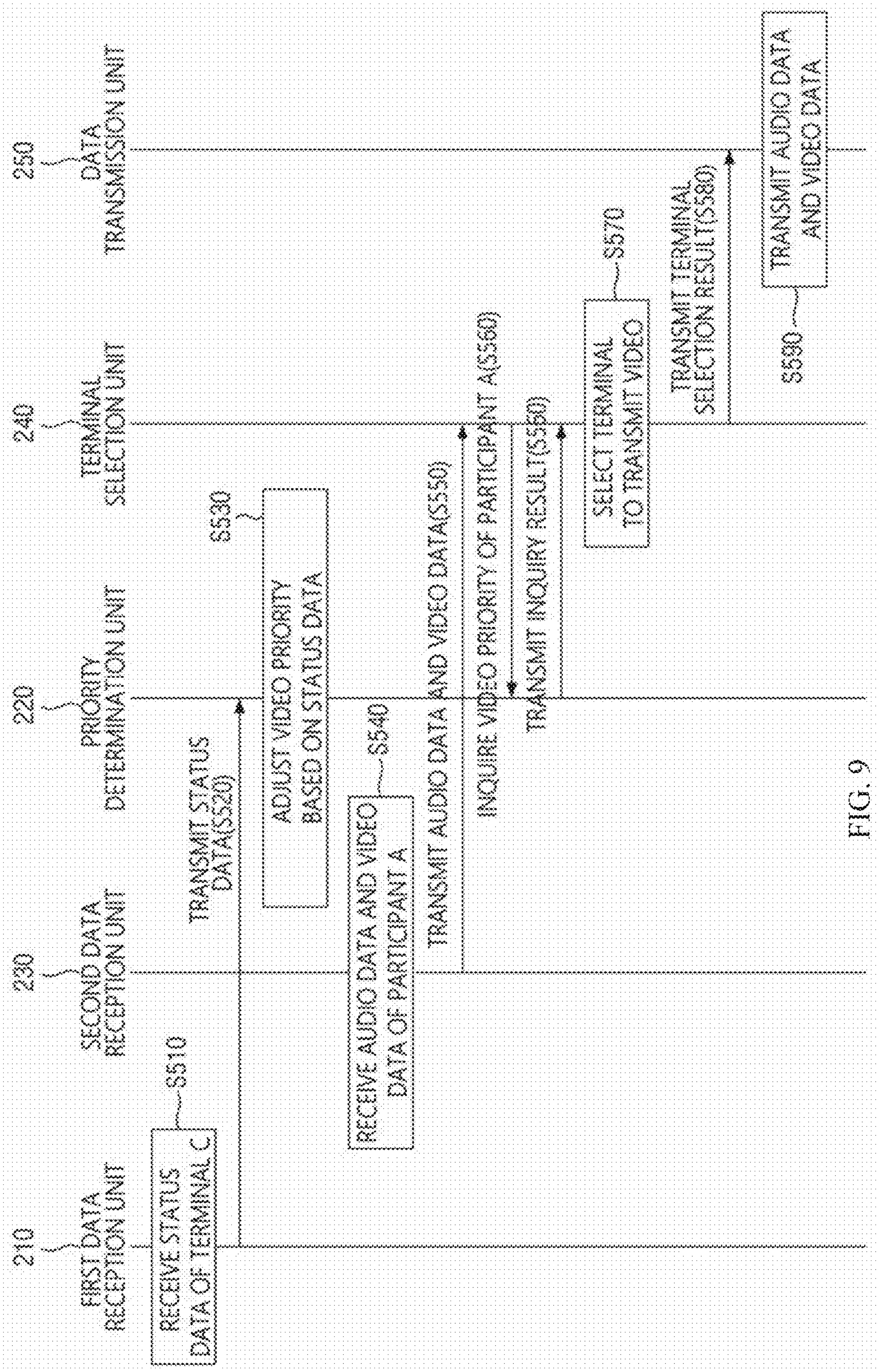
FIG. 9 is a signal flow diagram of the method for providing the video conference service described with reference to FIG. 8.

FIG. 9 is a signal flow diagram of the method for providing the video conference service described with reference to FIG. 8. However, this is only a preferred exemplary embodiment for achieving the object of the present disclosure, and some steps may also be added or deleted as needed. In addition, referring to FIG. 9, the content described with reference to FIGS. 2 to 5 and FIG. 8 may be more clearly understood.

As illustrated in FIG. 9, in step S510, when the participant A's account is logged out of the terminal B, the first data reception unit 210 may receive status data of the terminal B from the terminal B, and in step S520, the first data reception unit 210 may transmit the status data of the terminal B to the priority determination unit 220. The priority determination unit 220 may adjust the video priorities of the plurality of terminals logged in with the participant A's account based on the status data of the plurality of terminals, and may adjust or delete the video priority table by reflecting the adjusted video priorities. More specifically, if there is a terminal logged in with the participant A's account in addition to the terminal B, the video priority for the participant A's account may be adjusted, and if there is no terminal logged in with the participant A's account other than the terminal B, the video priority table for the participant A's account may be deleted.

In step S540, the second data reception unit 230 may receive audio data and video data from terminals logged in with the account of the participant A who is speaking at the conference, and in step S550, the second data reception unit 230 may transmit the received audio data and video data to the terminal selection unit 240. The terminal selection unit 240 may request the priority determination unit 220 to inquire about the video priorities of the terminals logged in with the participant A's account, and in step S560, the priority determination unit 220 may transmit an inquiry result for the video priority to the terminal selection unit 240 in response to the request. In this case, the transmitted inquiry result may be overall information about the video priorities of the terminals logged in with the participant A's account, and may be some information about a terminal with the highest video priority among the terminals logged in with the participant A's account.

Thereafter, the terminal selection unit 240 may select a terminal to transmit participant A's video based on the information received from the priority determination unit 220 in step S570, and may transmit a terminal selection result to the data transmission unit 250 in step S580. Finally, the data transmission unit 250 may transmit audio data and video data of the participant A. In this case, the audio data and video data of the participant A may be data received from the same terminal or different terminals.

Accordingly, the usability and convenience of the video conference service users may be improved by automatically adjusting the video priority according to the change in the login status of the participant's account on the participant's terminal. In addition, since the participant's video received from the optimal terminal selected based on the adjusted video priority may be transmitted, the video conference may be more effectively conducted, and the quality of the video conference service may be improved.

In summary, if the camera power status of the participant's terminal changes or the login status of the participant's account changes, the video priorities of the plurality of participants' terminals may be adjusted. In this case, the video priority may be adjusted so that the priority of a terminal with the camera turned on is higher than the priority of a terminal with the camera turned off. In addition, in the case of terminals with the same camera power status, the video priority may be adjusted so that a terminal with a higher video weight value reflecting the terminal's status data and additional data has a higher priority.

Hereinafter, a process of adjusting video priority according to a conference start, a participant admission (i.e., login), a participant exit (i.e., logout), and camera power status change during the video conference process will be described with reference to FIG. 10.

Figure 10:
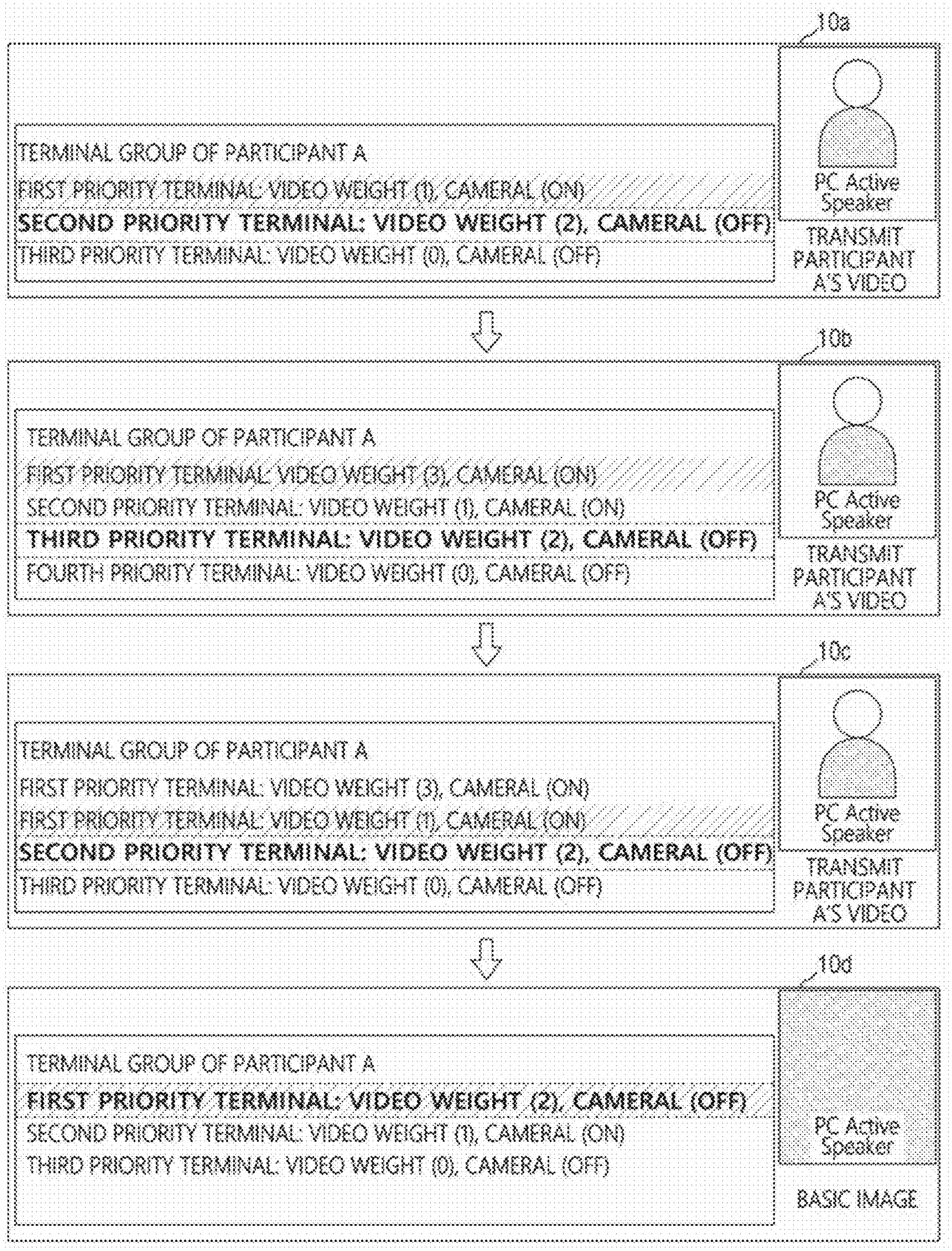
FIG. 10 is an exemplary diagram for describing a process of adjusting video priorities of participants' terminals according to an exemplary embodiment of the present disclosure.

FIG. 10 is an exemplary diagram for describing a process of adjusting video priority of participants' terminals according to an exemplary embodiment of the present disclosure.

First, it may be assumed that as a video conference begins, the participant A firstly logs in with his or her account on a specific terminal, and the participant A speaks in the conference through the specific terminal. In this case, since there is only one terminal logged in with the participant A's account, only a case in which participant A's video is or is not transmitted may occur depending on a power status of a terminal's camera. That is, if the camera of the specific terminal is turned on, the participant A's video received from the specific terminal may be transmitted to other participants' terminals. In addition, if the camera of the specific terminal is turned off, no video or image may be displayed on other participants' terminals, or a basic video or image may be displayed. In this case, the basic video or image may be a video or image set in advance by each participant in case no video is transmitted.

Hereinafter, in the case in which there are a plurality of terminals logged in with the participant A's account, a process of adjusting video priority and changing the transmitted video according to the adjustment result of a case in which the participant A's account is logged in on a new terminal, a case in which the participant A's account is logged out of the logged-in terminal, and a case in which a camera power status of the terminal is changed will be described.

Referring to a box 10*a* illustrated in FIG. 10, in the video priorities of the plurality of terminals logged in with the participant A's account, a terminal (a first terminal) with the video weight value of 1 and the camera turned on may be determined as a first priority, a terminal (a second terminal) with the video weight value of 2 but with the camera turned off may be determined as a second priority, and a terminal (a third terminal) with the video weight value of 0 and the camera turned off may be determined as a third priority. In this case, when the participant A speaks through the second priority terminal (the second terminal), the participant A's video received from the first priority terminal (the first terminal) with the camera turned on may be transmitted even if the camera of the second priority terminal is turned off. That is, the participant A's video captured through the camera of the first terminal with the highest video priority may be displayed on other participants' terminals.

First, when logging in with the participant A's account on a new terminal (a fourth terminal), a video priority may be adjusted based on status data and additional data of the new terminal (the fourth terminal) logged in. Referring to a box 10*b* illustrated in FIG. 10, since a video weight value of the new terminal (the fourth terminal) logged in with the participant A's account is 3 and a camera thereof is turned on, the video priority thereof may be calculated to be higher than that of the conventional first priority terminal (the first terminal) in which the terminal's video weight value is 1 and the camera is turned on. Therefore, the video priority of the new terminal (the fourth terminal) logged in with the participant A's account may be determined as a first priority, and the conventional first priority terminal (the first terminal) may be changed to a second priority terminal, and likewise, the video priority of the conventional second priority terminal (the second terminal) may be adjusted to the third priority terminal, and the video priority of the conventional third priority terminal (the third terminal) may be adjusted to the fourth priority terminal. In this case, even if the camera of the second terminal (the conventional second priority terminal, i.e., the adjusted third priority terminal) where the participant A is speaking is turned off, the participant A's video received from the first priority terminal with the camera turned on may be transmitted. That is, before adjusting the video priority, the terminal that would transmit the participant A's video was the first terminal, but after adjusting the video priority, the fourth terminal with the highest video priority may be selected as a video transmitting terminal, and the participant A's video captured through the camera of the fourth terminal may be displayed on other participants' terminals.

Second, if logout occurs on any one of the plurality of terminals logged in with the participant A's account, the video priority may be adjusted by deleting information about the logged out terminal (e.g., the fourth terminal). Referring to a box 10*c* illustrated in FIG. 10, if the participant A's account is logged out of the fourth terminal, which was the first priority terminal, information about the fourth terminal (video weight value of 3, camera power ON status) may be deleted. Accordingly, the conventional second priority terminal (the first terminal) among the plurality of terminals logged in with the participant A's account may be changed to the first priority terminal, and likewise, the video priority of the conventional third priority terminal (the second terminal) may be adjusted to the second priority terminal, and the video priority of the conventional fourth priority terminal (the third terminal) may be adjusted to the third priority terminal. In this case, even if the camera of the second terminal (the conventional third priority terminal, i.e., the adjusted second priority terminal) where the participant A is speaking is turned off, the participant A's video received from the first priority terminal with the camera turned on may be transmitted. That is, before adjusting the video priority, the terminal that would transmit the participant A's video was the fourth terminal, but after adjusting the video priority, the first terminal with the highest video priority may be selected as a video transmitting terminal, and the participant A's video captured through the camera of the first terminal may be displayed on other participants' terminals.

Third, if the camera power status of one of the plurality of terminals logged in with the participant A's account is changed, the video priority may be adjusted based on the changed camera power status. Referring to a box 10*d* illustrated in FIG. 10, as the camera of the first terminal (video weight value of 1, camera power ON status) is changed from a turned on state to a turned off state, the cameras of all terminals may be turned off. In this case, the conventional video priority may be changed by determining the video priority based on the video weight values of the plurality of terminals. Therefore, the video priority of the second terminal (the conventional second priority terminal) with the highest video weight value may be determined as a first priority, and the video priority of the conventional first priority terminal (the first terminal) may be adjusted to a second priority terminal. In this case, since the camera of the second terminal (the conventional second priority terminal, first priority terminal after adjustment) where the participant A is speaking is turned off, no video or image may be displayed on other participants' terminals, or a basic video or image may be displayed. Meanwhile, as described above, the basic video or image may be a video or image set in advance by each participant in case no video is transmitted.

So far, the method and device for providing the video conference service according to an exemplary embodiment of the present disclosure has been described with reference to FIGS. 2 to 10. According to the method for providing the video conference service according to an exemplary embodiment of the present disclosure, the audio and video of the participant may be provided to other participants through not only the same terminal but also different terminals. That is, since the participant's video is transmitted through other terminals logged in with the same participant's account even when the camera of the terminal where the audio of the participant who is speaking is input is turned off, the conference may be efficiently conducted, and the quality of the conference service may be effectively improved. Furthermore, the satisfaction and usability of the users using the video conference service may also be improved.

Figure 11:
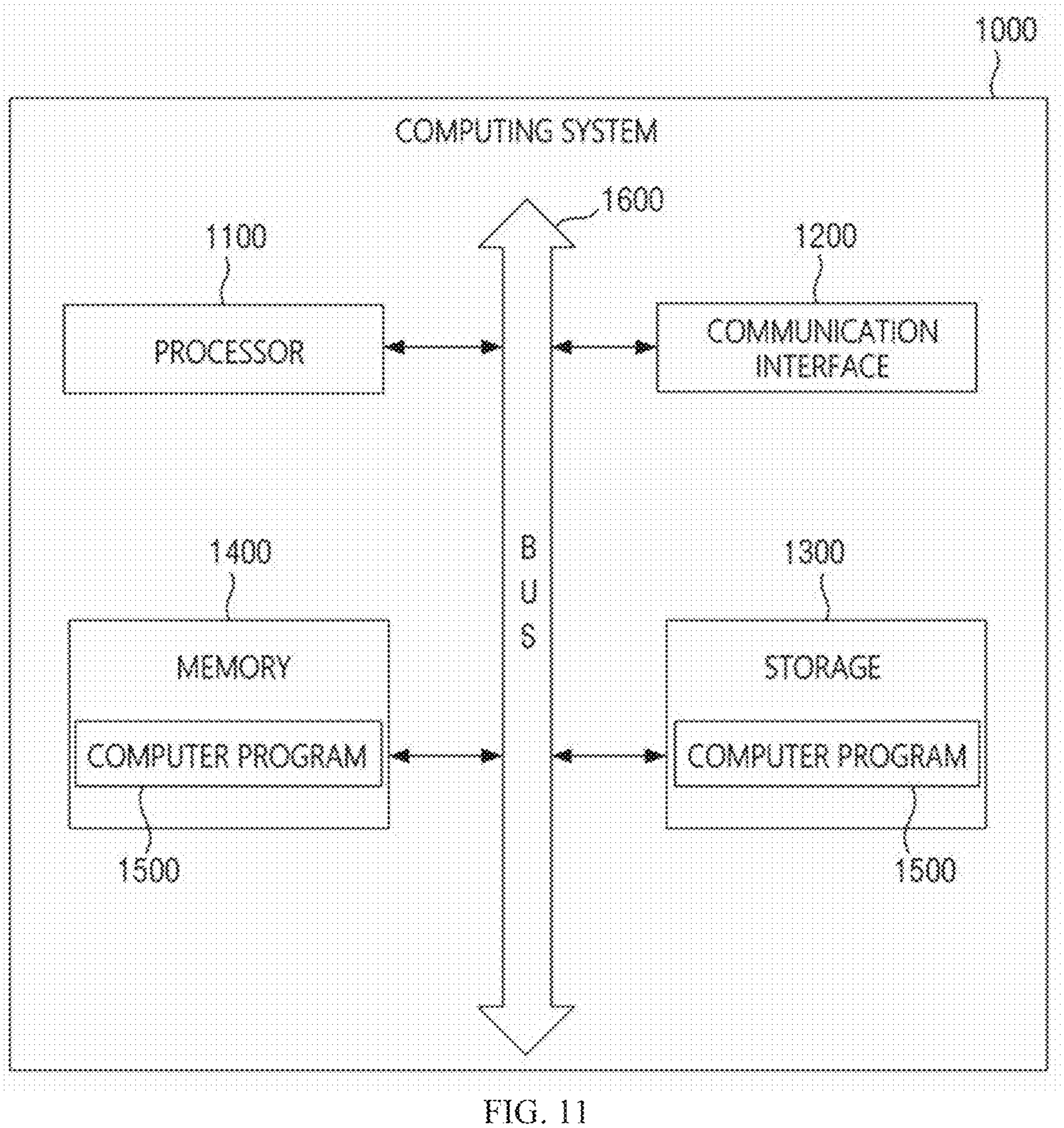
FIG. 11 is a hardware configuration diagram of a system for providing a video conference service according to some exemplary embodiments of the present disclosure.

FIG. 11 is a hardware configuration diagram of a system for providing a video conference service according to some exemplary embodiments of the present disclosure. A system 1000 for providing a video conference service illustrated in FIG. 12 may include one or more processors 1100, a system bus 1600, a communication interface 1200, a memory 1400 for loading a computer program 1500 executed by the processors 1100, and a storage 1300 for storing the computer program 1500.

The processor 1100 controls the overall operation of each component of the system 1000 for providing the video conference system. The processor 1100 may perform a calculation on at least one application or program for executing the methods/operations according to various exemplary embodiments of the present disclosure. The memory 1400 stores various data, instructions, and/or information. The memory 1400 may load one or more programs 1500 from the storage 1300 to execute the methods/operations according to various exemplary embodiments of the present disclosure. The system bus 1600 provides a communication function between components of the system 1000 for providing the video conference service. The communication interface 1200 supports Internet communication of the system 1000 for providing the video conference service. The storage 1300 may non-temporarily store one or more computer programs 1500. The computer program 1500 may include one or more instructions in which the methods/operations according to various exemplary embodiments of the present disclosure are implemented. When the computer program 1500 is loaded into the memory 1400, the processor 1100 may perform the methods/operations according to various exemplary embodiments of the present disclosure by executing the one or more instructions.

In some exemplary embodiments, the system 1000 for providing the video conference service described with reference to FIG. 11 may be configured using one or more physical servers included in a server farm based on a cloud technology such as a virtual machine. In this case, at least some of the processor 1100, the memory 1400, and the storage 1300 among the components illustrated in FIG. 11 may be virtual hardware, and the communication interface 1200 may also be implemented as a virtualized networking element such as a virtual switch.

Embodiments of the present disclosure have been described above with reference to FIGS. 1 through 11, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A method for providing a video conference service performed on at least one computing device, the method comprising:

receiving status data of a plurality of terminals logged in with an account of a first participant;

determining video priorities of the plurality of terminals based on the received status data;

selecting a first terminal, among the plurality of terminals, to transmit a video of the first participant based on the video priorities; and transmitting the video of the first participant received from the first terminal to terminals of other participants, wherein the status data includes a group ID corresponding to the account of the first participant, a terminal ID of a terminal of the first participant, and information about a camera power status of the terminal of the first participant, and wherein a video priority is determined based on a video weight value, the video weight value being obtained using the status data and additional data, and wherein the additional data includes at least one of a video resolution of the terminal of the first participant, network quality information of the terminal of the first participant, a distance from the first participant, and an analyzed intention of the first participant who speaks.

2. The method of claim 1, wherein the video priority has a value that increases as the video weight value increases.

3. The method of claim 1, wherein the video priority is adjusted based on at least one of a change in a login status of the account of the first participant and a change in the camera power status of the terminal of the first participant.

4. The method of claim 1, wherein the selecting of the first terminal includes:

inquiring video priority data for the account of the first participant in a video priority table associated with one or more accounts of each participant; and selecting, based on a result of the inquiring, the first terminal that has a highest video priority among the plurality of terminals.

5. The method of claim 4, wherein the first terminal has the highest video priority based on a camera of the first terminal being turned on.

6. The method of claim 1, further comprising:

receiving status data from a second terminal, based on the second terminal, previously not logged in with the account of the first participant, being logged in with the account of the first participant;

adjusting video priorities of a plurality of terminals including the second terminal, based on the status data of the second terminal;

reselecting a terminal, among the plurality of terminals including the second terminal, to transmit the video of the first participant based on the adjusted video priorities; and transmitting the video of the first participant received from the reselected terminal to the terminals of the other participants.

7. The method of claim 1, further comprising:

adjusting the video priorities of the plurality of terminals based on the first terminal being logged out of the account of the first participant;

reselecting a terminal, among the plurality of terminals, to transmit the video of the first participant based on the adjusted video priorities; and transmitting the video of the first participant received from the reselected terminal to the terminal of the other participants.

8. The method of claim 1, further comprising:

adjusting the video priorities of the plurality of terminals based on a camera power status of the first terminal being changed;

reselecting a terminal, among the plurality of terminals, to transmit the video of the first participant based on the adjusted video priorities; and transmitting the video of the first participant received from the reselected terminal to the terminal of the other participants.

9. A system for providing a video conference service, the system comprising:

at least one processor; and a memory configured to store instructions, wherein the instructions, when executed by the at least one processor, cause the at least one processor to perform:

receiving status data of a plurality of terminals logged in with an account of a first participant;

determining video priorities of the plurality of terminals based on the received status data;

selecting a first terminal, among the plurality of terminals, to transmit a video of the first participant based on the video priorities; and transmitting the video of the first participant received from the first terminal to terminals of other participants, wherein the status data includes a group ID corresponding to the account of the first participant, a terminal ID of a terminal of the first participant, and information about a camera power status of the terminal of the first participant, wherein a video priority is determined based on a video weight value, the video weight value being obtained using the status data and additional data, and wherein the additional data includes at least one of a video resolution of the terminal of the first participant, network quality information of the terminal of the first participant, a distance from the first participant, and an analyzed intention of the first participant who speaks.

10. The system of claim 9, wherein the video priority is adjusted based on at least one of a change in a login status of the account of the first participant and a change in the camera power status of the terminal of the first participant.

11. The system of claim 9, wherein the selecting of the first terminal includes:

inquiring video priority data for the account of the first participant in a video priority table associated with one or more accounts of each participant; and selecting, based on a result of the inquiring, the first terminal that has a highest video priority among the plurality of terminals.

12. The system of claim 9, wherein the instructions further cause the at least one processor to perform:

receiving status data from a second terminal, based on the second terminal, previously not logged in with the account of the first participant, being logged in with the account of the first participant;

adjusting video priorities of a plurality of terminals including the second terminal, based on the status data of the second terminal;

reselecting a terminal, among the plurality of terminals including the second terminal, to transmit the video of the first participant based on the adjusted video priorities; and transmitting the video of the first participant received from the reselected terminal to the terminals of the other participants.

13. The system of claim 9, wherein the instructions further cause the at least one processor to perform:

adjusting the video priorities of the plurality of terminals based on the first terminal being logged out of the account of the first participant;

reselecting a terminal, among the plurality of terminals, to transmit the video of the first participant based on the adjusted video priorities; and transmitting the video of the first participant received from the reselected terminal to the terminal of the other participants.

14. The system of claim 9, wherein the instructions further cause the at least one processor to perform:

adjusting the video priorities of the plurality of terminals based on a camera power status of the first terminal being changed;

reselecting a terminal, among the plurality of terminals, to transmit the video of the first participant based on the adjusted video priorities; and transmitting the video of the first participant received from the reselected terminal to the terminal of the other participants.

* * * * *